Jan. 29, 1935.  J. C. OLSEN  1,989,147
BELT FASTENER
Filed Sept. 20, 1933
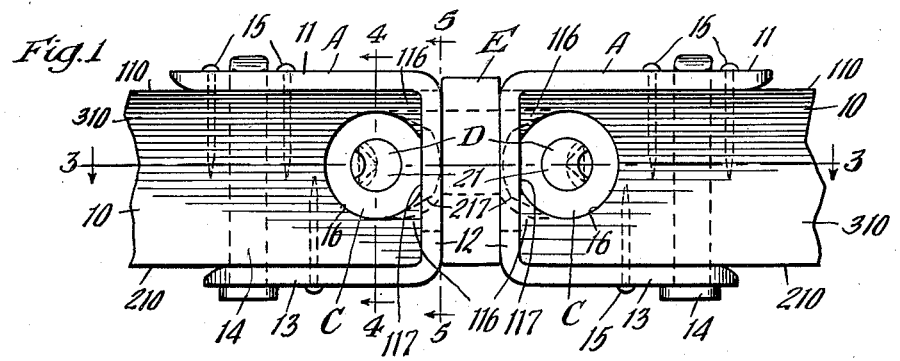
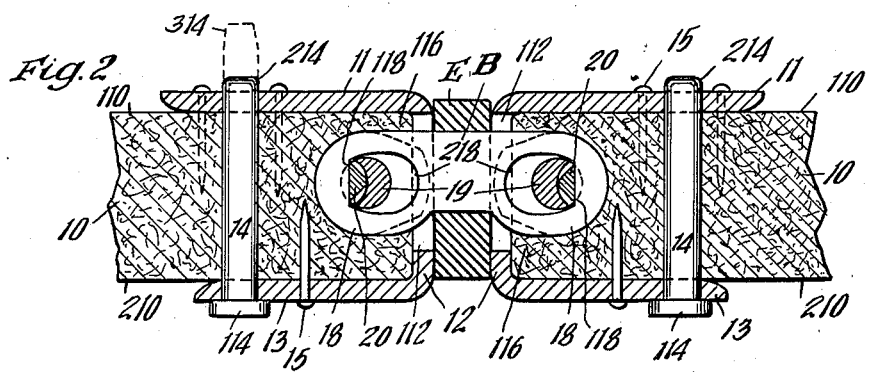
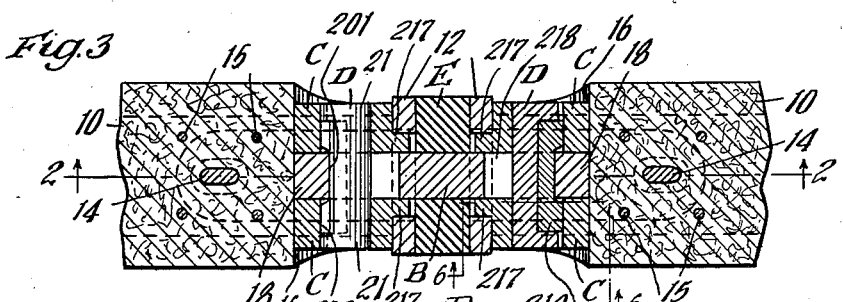
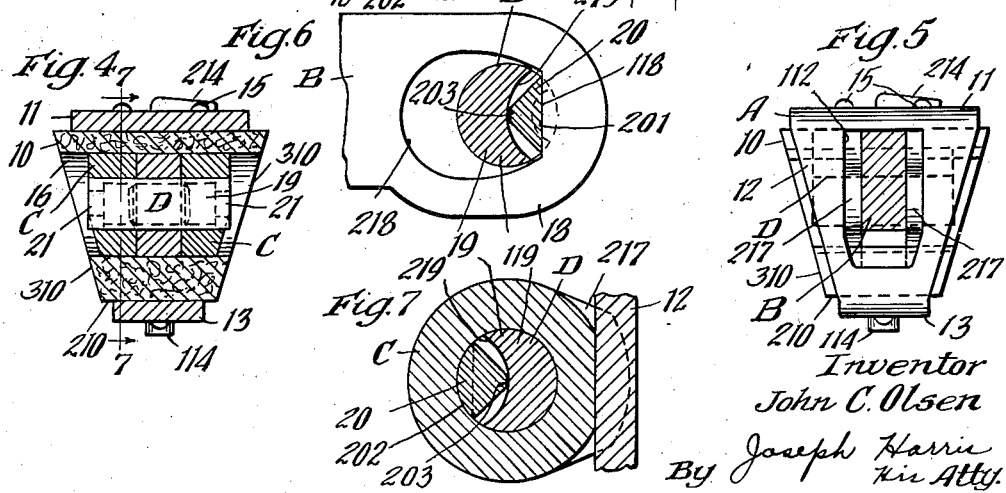
Inventor
John C. Olsen
By Joseph Harris
his Atty.

Patented Jan. 29, 1935

1,989,147

UNITED STATES PATENT OFFICE 1,989,147

BELT FASTENER

John C. Olsen, Chicago, Ill., assignor to Flexible Steel Lacing Company, Chicago, Ill., a corporation of Illinois Application September 20, 1933, Serial No. 690,182

8 Claims. (Cl. 24—33)

This invention relates to improvements in belt fastener.

In belt drives for motor generators and various other machines, it is now common practice to use what are generally known as V-belts, the use of which is constantly expanding. Said V-belts are generally comprised of fabric such as canvas and rubber or rubber composition and so molded as to provide a substantially V or wedge section to thus adapt the belts to run over grooved pulleys.

A difficulty heretofore encountered in the practical use of such V-belts, particularly where used for transmitting appreciably heavy loads and under adverse working conditions as in the case of generator drives for car lighting systems, has been to provide a satisfactory fastener for the ends of the belts. Due to the usual composition and the thick but relatively narrow cross sectional form of the V-belts, belt fasteners such as used with ordinary leather belts are neither adaptable nor satisfactory for connecting the ends of V-belts.

General objects of the invention are to provide an efficient and staunch fastener of the flexible type more particularly, but not exclusively, for the ends of V-belts; to provide a fastener the parts of which may be ruggedly and firmly attached to the respective ends of the belt with minimum danger of disrupting or injuring the belt material either during application or under load; to provide a flexible or self-adjustable fastener wherein the parts may be readily disconnected without, however, necessitating removal of the attaching elements proper from the belt ends; to so construct the attaching elements proper and their securing means to the belt ends that the pulling stresses will be transferred to the belt ends at points relatively remote from the ends proper of the belt to minimize tearing out under load; and to provide a flexible fastener for the ends of a V-belt such that the fastener may be used on belts running over pulleys of small diameter without loss of efficiency or danger of breakage.

A more specific object of the invention is to provide a flexible or self-adjustable belt fastener more especially adapted for V-belts, wherein sectional rocker pins are employed so constructed, arranged and mounted that wear is held to a minimum and, further, the lines of pivotal or rocking contact are constantly maintained at the desired centers.

Other objects of the invention will more clearly appear from the description and claims hereinafter following.

In the drawing forming a part of this specification, Figure 1 is a side elevational view of the adjacent ends of a belt showing the improved fastener applied thereto; Figure 2 is a vertical, longitudinal central sectional view of the construction shown in Figure 1 and corresponding substantially to the line 2—2 of Figure 3. Figure 3 is a horizontal, sectional view corresponding to the section line 3—3 of Figure 1. Figures 4 and 5 are vertical transverse sectional views corresponding to the lines 4—4 and 5—5 respectively of Figure 1. Figure 6 is an enlarged detailed sectional view corresponding to the line 6—6 of Figure 3. And Figure 7 is a similar enlarged view corresponding to the section line 7—7 of Figure 4.

In said drawing, 10—10 denote the adjacent end portions of a V-belt which, ordinarily, will be comprised of rubber and imbedded fabric with its upper or outer face 110 appreciably wider than its lower or inner face 210 and having inwardly or downwardly converging side walls 310—310 adapting the same to run on groove pulleys.

The improved belt fastener, as shown, comprises a pair of preferably like attaching members A—A; a connecting link or a tension member B; bearing elements C—C; and rocker pins D—D. An interposed block of resilient material, such as live rubber, may also be used between the attaching members A, as indicated at E.

Each of the attaching members A, as shown, is preferably in the form of a horizontally disposed U or bail-like member, having an upper arm 11, vertical inner end section or bight 12 and lower or inner arm 13. The arms 11 and 13 are so spaced as to snugly embrace and overlie the upper and lower surfaces respectively of the belt end portion and, when employed with a V-belt, the upper arm 11 will be wider than the lower arm, as clearly shown in Figure 4, the widths being slightly less than the widths of the respective upper and lower surfaces 110 and 210 of the belt proper so as to insure clearance of the sides of the grooves of the pulleys. The arms of the members A are attached to the end portions of the belt by any suitable means but preferably by a heavy pin 14 and a plurality of smaller pins or brads 15—15. The heavy pin 14 is located as far as practically possible from the end face proper of the belt end and is entered through alined openings in the arms 11 and 13 as shown, the bottom or inner end of the pin 14 being riveted over or flattened, as indicated at 114 and the upper end being hammered or bent over as indicated at 214. Particular attention is directed to the cross sectional form of the pins 14 which, as shown, are relatively thin or narrow in a direction transverse to the line of the belt and relatively elongated in a direction parallel to the line of the belt with the front and rear edges rounded off, all as clearly shown in Figure 3. Preferably also, the entering ends of the pins 14 will be tapered as indicated at 314. While attaching pins of the construction described may be driven through the belt without previous formation of a hole or bore, nevertheless in actual practice, the belt will preferably be punched with a punch of the same section as the pin, the punch being mounted in a fixture for this purpose. By reason of the cross sectional form and rounded edges of the pins and punch, there will be no appreciable disruption or breaking of the belt material, the latter being slightly crowded laterally without, however, bulging or swelling the belt in line with the pin. In this manner, there is thus afforded a very staunch connection with minimization of danger of the anchoring pin pulling out under tension loads. The additional attaching pins 15 are preferably in the form of small brads with the usual pointed and rounded shanks, the same being driven through previously prepared holes in the arms 11 and 13 and entering the belt material approximately halfway, as shown. The pins 15 will have a friction fit with the arms of the attaching member. Preferably, four such pins 15 are employed on the top or outer surface of the belt and one on the bottom. The pins 15, as will be obvious, are also of such construction as to minimize possibility of disrupting the material of the belt.

Prior to attachment of the members A, each belt end will be prepared by boring out an approximately cylindrical opening 16 transversely therethrough and in line with the neutral axis of the belt, as shown, said opening 16 being for the accommodation of the bearing elements C and pin D, as hereinafter described. The vertical section 12 of each member A is provided with a rectangular centrally disposed aperture 112 as best shown in Figures 2 and 5, for accommodation of the link B.

Each of the bearing elements C, of which two are used in association with each member A, preferably comprises a cylindrical sleeves or ring partially cut off to provide a flat bearing surface 117 and additionally formed with a shallow lip or flange 217 entering within and bearing against the side edge of the opening 112. The flat surfaces 117 are disposed in bearing engagement with the inner surfaces of the vertical or bight sections 12 of the members A. The bearing members C are of such dimension, axially, that they may be successively entered through the openings 112 and then shifted laterally into their proper positions, as best shown in Figure 3 and, when in position, leave sufficient space therebetween to enter the ends of the link B, as shown. With this construction, it will be observed that the bearing elements C, when in position, are prevented from rotating and all pulling loads transmitted thereto are, in turn, directly transmitted to the bight sections 12 of the corresponding members A. In actual practice also, the bearing elements C will have a snug more or less tight frictional engagement with the material of the belt.

The link B, only one of which will preferably be employed in a V-belt arrangement, but the number of which may be increased in case of wider belts, is of elongated form as best shown in Figure 2 with more or less elliptical ends 18—18, each of which ends is provided with an aperture or opening of special shape. Each said opening is defined at one end nearest the corresponding end of the link by a vertically extending flat bearing surface 118, the remainder of the opening being of approximately oval contour, as indicated at 218, the entire opening being of sufficient extent to permit free angular movement of the link with reference to the rocker pin D, hereinafter described in detail, as best shown in Figures 2 and 6. The link B is of such thickness as to snugly fill the spaces between the bearing elements C when the latter are in position, as shown in Figure 3, and of such dimension vertically as to normally engage the upper and lower lips 116—116 of the belt material formed by the transverse opening 16. In this manner, the resilient material of the belt normally tends to keep the link B in alignment with the center lines of the belt ends while permitting of rocking of the link when passing over the pulleys, as will be understood.

Each rocker pin D consists of two sections 19 and 20. The section 19 is relatively longer than the section 20 and, at each of its ends, is of approximately complete cylindrical form as indicated at 21 in Figure 1, where it is snugly received within the corresponding bearing element C. Intermediate its ends 21, each rocker pin element 19 for a length corresponding to the length of the other element 20, is of thick crescent or moon cross section, as indicated at 119, best in Figures 6 and 7, the inner or smaller arcuate surface 219 facing toward the flat vertical bearing surface 118 of the link, previously referred to.

Each rocker pin section 20 is of substantially triangular cross section centrally of its length so as to provide a flat bearing surface 201 to seat on the link flat bearing surface 118, as shown in Figure 6. Said flat bearing surface 201 extends for a distance slightly greater than the thickness of the link B through which it is entered and, beyond said flat bearing surface 201, the pin section 20 is of generally sector shape, as indicated at 202 in Figure 7, the curved portion of the sector sections being on a radius similar to the radius of the outside surface of the other pin section 19 so that, where the end portions of the two pin sections 19 and 20 are received within the bearing elements C, they are centered by the latter and hence cannot shift up and down relatively to each other as viewed in Figure 7, but such relative movement as occurs between the two pin sections 19 and 20 is confined to a true rocking or pivotal movement at the center of the bearings about the slightly rounded fulcrum edge 203 of the pin section 20. The rounded fulcrum edge 203 is somewhat exaggerated in the drawing to more clearly illustrate the construction but essentially, the line of fulcrumming action is practically confined to the center line or axis of the composite rocker pin which coincides with the center or axis of the bearing openings in the bearing elements C. As clear from Figure 3, after the parts are assembled, the pin element 20 cannot shift in the direction of its length relative to the link B and neither can the pin element 19 shift in the direction of its length relative to the pin element 20 so that, when the parts are properly assembled and any tension is on the link, the parts cannot become disassembled. In assembling the rocker pins, the link B will be pushed endwise sufficient for the assembled sections 19 and 20 of each pin to be entered through the opening 218 with the end shoulders 202 of the pin section 20 clearing the flat bearing surface 118 of the link, after which the link is pulled out and the flat bearing surfaces 118 and 201 seated against each other, as shown. With the link bearing elements and rocker pin construction shown and described, all pivotal or rocking movements of the link with reference to each rocker pin is confined practically to a line coinciding with the axis of the sectional pin and hence, coinciding with the axial line of the bearing elements C and no relative bodily shifting between the rocker pin elements is permissible. With such construction, actual experience has shown that the wear on the parts is almost entirely eliminated and the life of the connection greatly extended. Preferably, the link will be made of case hardened steel and the pin sections of heat-treated tool steel, the bearing elements C being preferably of copper.

In actual practice, it is desirable under certain operating conditions, to employ a compressible block or washer of live rubber or the like, as indicated at E. Not only does this serve the purpose of assisting in maintaining all of the parts taut while allowing the necessary flexing when running over the pulleys but performs an additional function in that it closes the openings 112 of the attaching members A and snugly engages the link B, thus preventing or minimizing the entrance of dirt or other foreign matter into the belt fastener parts.

With the construction shown and described, it will be observed that the pulling stresses between the ends of the belt are transmitted over relatively large areas from the link through the pins and bearing elements, first to the inner faces of the bight sections of the members A and from the latter to points relatively distantly located in the belt end portions. Furthermore, because of the manner in which the bight sections engage the flat end faces proper of the belt and the arms embrace the belt, there is no tendency to swell or bulge the belt material or cause excessive wear thereof and the fastener, considered in its entirety, affords an exceedingly strong and durable connection capable of transmitting maximum loads for a given size belt.

Although the invention has herein been shown and described with particular reference to one form of belt and preferred embodiment of the fastener, nevertheless the same is by way of description only and not by way of limitation since, as will be apparent to those skilled in the art, various features of the invention may be adapted to other types of belts and various changes and details of construction made without departing from the spirit of the invention. All changes and modification are contemplated that come within the scope of the claims appended hereto.

What is claimed is:

1. In a fastener for the ends of a belt, the combination with members adapted to be attached to the respective belt ends and having apertured end sections positioned opposite and against the respective ends of the belt, said sections having inner bearing faces; of sectional rocker bearing pins located on the inner sides of said member end sections and within the respective belt ends; and connecting means extending through said apertured end sections and between said pins, said connecting means being angularly movable with respect to each of said members.

2. In a fastener for the ends of a belt, the combination with bail-like members attachable to the respective ends of the belt the bight of each said member being apertured and adapted to be positioned directly against the corresponding end of the belt; of connector means extending through the apertures of the bight portions of said members; and sectional rocker pins providing an adjustable connection between the respective ends of said connector means and the inner sides of the bight portions of said members, said pins, when the fastener is operatively attached to the belt ends, being disposed within the belt material.

3. In a fastener for the ends of a belt, the combination with a pair of bail-like attaching members each adapted to embrace one end of the belt and having an opening in the bight portion thereof; of means for attaching the arms of said members to the belt ends; a link extending between and through said openings in the bights of said members, said link having an opening at each end thereof; and a multiple part pin extending through the opening at each end of the link and within the corresponding bight, said parts being adapted to rock on and with respect to each other and one only of said parts having flat bearing engagement with the corresponding link end.

4. In a V-belt fastener, the combination with two attaching members, each having upper and lower longitudinally extending arms and a connecting end section, the latter being centrally apertured; means for attaching the arms to the respective belt ends; a link between said members and having its ends extended through the apertures; detachable bearing elements seated against the inner side of each of said end sections, one bearing element on each side of the link; and means providing a pivotal connection between each link end and corresponding set of bearing elements, said means comprising a sectional rocker pin extending through the link end and seated at its ends in said bearing elements, whereby the sections of the pin provide a rocking action therebetween and a journaled action is provided between the pin and the bearing elements.

5. In a fastener for the ends of a belt, the combination with a pair of bail-like attaching members each adapted to embrace and be secured to an end of the belt and provided with an opening through the bight portion thereof; of detachable bearing elements non-rotatably seated against the inner faces of the bight portions; rocker pins journaled at their ends in said bearing elements, each rocker pin comprising two sections adapted to rock one on the other on a line substantially coinciding with the axis of the bearing elements, relative bodily shift of the two pin sections being restricted by and within the bearings of said bearing elements; and a link extended at its ends through said bight openings and having non-rockable engagement with one of the sections of each of the rocker pins.

6. In a fastener for the ends of a belt, the combination with a pair of bail-like attaching members each adapted to be secured to an end of a belt and provided with an opening through the bight portion thereof; a link extended at its ends through said openings to the inner sides of the bight portions; a sectional rocker pin extended through each end of the link within the bight portion, one section of each pin being adapted to rock on the other and having flat bearing engagement with the corresponding link end; and bearing elements at opposite sides of the link within each bight portion and in which are journaled the ends of the rocker pins, said 7. In a fastener for the ends of a belt, the combination with a pair of bail-like attaching members each adapted to be attached to an end of a belt, the bight portions thereof being apertured; a pair of laterally separated bearing elements non-rotatably seated against the inner face of each of the bight portions; a link extended at its ends through the bight openings and between the respective bearing elements, the link being apertured at each end and each apertured having a flat bearing surface; a two part rocker pin extending through each link opening with the ends of the pin seated within the corresponding bearing elements, one of the parts of each rocker pin having a flat bearing face engageable with the corresponding flat bearing face of the link opening, said part being adapted to rock on the other part of the hinge pin, one part of each hinge pin being shouldered at its ends to overlie the ends of the other part and the latter being shouldered to overlie the sides of the link whereby to prevent accidental shift of the rocker pins endwise.

8. As an article of manufacture, a rocker pin for belt fasteners of link type, said rocker pin comprising: two elements each having exterior surfaces at their ends of a common radius, one element being longer than the other and having shoulders at its ends overlying the ends of the shorter element to prevent relative axial shift therebetween, the longer of said elements having an arcuate bearing surface extending lengthwise thereof and the shorter element a cooperable bearing substantially knife edge, the shorter element on its exterior surface intermediate its ends, having a flat bearing surface with shoulders at the ends thereof whereby the same is adapted to cooperate with a link to provide a non-rockable and non-shiftable bearing therebetween.

JOHN C. OLSEN.